United States Patent
Zheng et al.

(10) Patent No.: US 12,134,404 B2
(45) Date of Patent: Nov. 5, 2024

(54) SYSTEM AND METHOD FOR DETECTING A PERCEIVED LEVEL OF DRIVER DISCOMFORT IN AN AUTOMATED VEHICLE

(71) Applicant: Honda Motor Co., Ltd., Tokyo (JP)

(72) Inventors: Zhaobo K. Zheng, San Jose, CA (US); Kumar Akash, Milpitas, CA (US); Teruhisa Misu, San Jose, CA (US)

(73) Assignee: HONDA MOTOR CO., LTD., Tokyo (JP)

( * ) Notice: Subject to any disclaimer, the term of this patent is extended or adjusted under 35 U.S.C. 154(b) by 241 days.

(21) Appl. No.: 17/829,664

(22) Filed: Jun. 1, 2022

(65) Prior Publication Data
US 2023/0391366 A1  Dec. 7, 2023

(51) Int. Cl.
*B60W 60/00* (2020.01)
*B60W 40/08* (2012.01)
*B60W 50/10* (2012.01)
*G06V 20/58* (2022.01)

(52) U.S. Cl.
CPC ........ *B60W 60/0013* (2020.02); *B60W 40/08* (2013.01); *B60W 50/10* (2013.01); *B60W 60/005* (2020.02); *G06V 20/58* (2022.01); *B60W 2040/0872* (2013.01);
(Continued)

(58) Field of Classification Search
CPC .............. B60W 60/0013; B60W 50/14; G06V 20/597; G06N 3/08; G05D 1/0219; G05D 1/0055
See application file for complete search history.

(56) References Cited

U.S. PATENT DOCUMENTS

| | | | |
|---|---|---|---|
| 2019/0056731 A1* | 2/2019 | Westbrook | G05D 1/0055 |
| 2021/0064044 A1* | 3/2021 | Refaat | G05D 1/0219 |
| 2021/0081780 A1* | 3/2021 | Tawari | G06N 3/08 |

(Continued)

OTHER PUBLICATIONS

P. C. Cacciabue, "Modelling driver behaviour in automotive environments: Critical issues in driver interactions with Intelligent transport systems," Model. Driv. Behav. Automot. Environ. Crit. Issues Driv. Interact. with Intell. Transp. Syst., pp. 1-440, 2007, doi: 10.1007/978-1-84628-618-6.

(Continued)

*Primary Examiner* — Yuri Kan
(74) *Attorney, Agent, or Firm* — RANKIN, HILL & CLARK LLP

(57) ABSTRACT

A system and method for detecting a perceived level of driver discomfort in an automated vehicle that include receiving image data associated with a driving scene of an ego vehicle, dynamic data associated with an operation of the ego vehicle, and driver data associated with a driver of the ego vehicle during autonomous operation of the ego vehicle. The system and method also include analyzing the image data, the dynamic data, and the driver data and extracting features associated with a plurality of modalities. The system and method additionally include analyzing the extracted features and detecting the perceived level of driver discomfort. The system and method further include analyzing the perceived level of driver discomfort and detecting a probable driver takeover intent of the driver of the ego vehicle to takeover manual operation of the ego vehicle.

20 Claims, 6 Drawing Sheets

(52) U.S. Cl.
CPC .. *B60W 2420/403* (2013.01); *B60W 2540/221* (2020.02); *B60W 2540/225* (2020.02); *B60W 2540/229* (2020.02)

(56) References Cited

U.S. PATENT DOCUMENTS

| | | | |
|---|---|---|---|
| 2022/0203996 A1* | 6/2022 | Katz | B60W 50/14 |
| 2023/0192095 A1* | 6/2023 | Liu | G06V 20/597 |
| | | | 340/576 |

OTHER PUBLICATIONS

N. Du et al., "Predicting driver takeover performance in conditionally automated driving," Accid. Anal. Prev., vol. 148, p. 105748, Dec. 2020, doi: 10.1016/J.AAP.2020.105748.

Epic Games, "Unreal Engine." https://www.unrealengine.com/en-US/.

SAE, "Taxonomy and Definitions for Terms Related to Driving Automation Systems for On-Road Motor Vehicles—SAE International," 2018. https://www.sae.org/standards/content/j3016_201806/ (accessed Feb. 10, 2022).

K. Akash and N. Jain, "Toward Adaptive Trust Calibration for Level 2 Driving Automation," Netherlands ACM Ref. Format Kumar Akash, vol. 20, doi: 10.1145/3382507.3418885.

G. Dorantes Argandar, F. Tortosa Gil, and J. Ferrero Berlanga, "Measuring situations that stress Mexicans while driving," Transp. Res. Part F Traffic Psychol. Behav., vol. 37, pp. 154-161, Feb. 2016, doi: 10.1016/J.TRF.2015.12.014.

J. Ayoub, N. Du, X. J. Yang, and F. Zhou, "Predicting Driver Takeover Time in Conditionally Automated Driving," 2020.

S. G. Baker et al., "How to interpret a small increase in AUC with an additional risk prediction marker: decision analysis comes through," Stat Med. Sep. 28, 2014; 33(22): 3946-3959., doi: 10.1002/sim.6195.

M. Beggiato, F. Hartwich, and J. Krems, "Physiological correlates of discomfort in automated driving," Transp. Res. Part F Traffic Psychol. Behav., vol. 66, pp. 445-458, Oct. 2019, doi: 10.1016/J.TRF.2019.09.018.

C. N. Boda, M. Dozza, P. Puente Guillen, P. Thalya, L. Jaber, and N. Lubbe, "Modelling discomfort: How do drivers feel when cyclists cross their path?," Accid. Anal. Prev., vol. 146, p. 105550, Oct. 2020, doi: 10.1016/J.AAP.2020.105550.

A. P. Bradley, "The use of the area under the ROC curve in the evaluation of machine learning algorithms," Pattern Recognit., vol. 30, No. 7, pp. 1145-1159, Jul. 1997, doi: 10.1016/S0031-3203(96)00142-2.

B. Cahour, Discomfort, affects and coping strategies in driving activity.

O. Carsten and M. H. Martens, "How can humans understand their automated cars? HMI principles, problems and solutions," Technol. Work, vol. 21, pp. 3-20, 2019, doi: 10.1007/s10111-018-0484-0.

K. N. De Winkel,—Tuğrul Irmak, V. Kotian,—Daan, M. Pool, and—Riender Happee, "Relating individual motion sickness levels to subjective discomfort ratings," vol. 1, p. 3, doi: 10.1007/s00221-022-06334-6.

A. Dettmann et al., "Comfort or Not? Automated Driving Style and User Characteristics Causing Human Discomfort in Automated Driving," https://doi.org/10.1080/10447318.2020.1860518, vol. 37, No. 4, pp. 331-339, 2021, doi: 10.1080/10447318.2020.1860518.

N. Du, X. J. Yang, and F. Zhou, "Psychophysiological responses to takeover requests in conditionally automated driving," Accid. Anal. Prev., vol. 148, p. 105804, Dec. 2020, doi: 10.1016/J.AAP.2020.105804.

C. Gold, R. Happee, and K. Bengler, "Modeling take-over performance in level 3 conditionally automated vehicles," Accid. Anal. Prev., vol. 116, pp. 3-13, Jul. 2018, doi: 10.1016/J.AAP.2017.11.009.

Y. He et al., "Adaptive Cruise Control Strategies Implemented on Experimental Vehicles: A Review," IFAC-PapersOnLine, vol. 52, No. 5, pp. 21-27, Jan. 2019, doi: 10.1016/J.IFACOL.2019.09.004.

K. He, G. Gkioxari, P. Dollar, and R. Girshick, "Mask R-CNN." [Online]. Available: https://github.com/.

J. A. Healey and R. W. Picard, "Detecting Stress During Real-World Driving Tasks Using Physiological Sensors," 2004.

E. Himonides, T. A. Stoffregen, J. Terken, T. H. Weisswange, S. Ittner, and D. Mühlbacher, "The Discomfort of Riding Shotgun— Why Many People Don't Like to Be Co-driver," 2020, doi: 10.3389/fpsyg.2020.584309.

Intel, "Mobiloeye." https://www.mobileye.com/.

D. S. Lee, T. W. Chong, and B. G. Lee, "Stress Events Detection of Driver by Wearable Glove System," IEEE Sens. J., vol. 17, No. 1, pp. 194-204, Jan. 2017, doi: 10.1109/JSEN.2016.2625323.

L. Oliveira, K. Proctor, C. G. Burns, and S. Birrell, "Driving Style: How Should an Automated Vehicle Behave?," doi: 10.3390/info10060219.

E. Pakdamanian, S. Heo, S. Sheng, S. Kraus, S. Baee, and L. Feng, "DeepTake: Prediction of Driver Takeover Behavior using Multimodal Data; DeepTake: Prediction of Driver Takeover Behavior using Multimodal Data," doi: 10.1145/3411764.3445563.

A. K. Pradhan, J. Crossman, and A. Sypniewski, "Improving Driver Engagement During L2 Automation: a Pilot Study."

V. Radhakrishnan et al., "Measuring Drivers' Physiological Response to Different Vehicle Controllers in Highly Automated Driving (HAD): Opportunities for Establishing Real-Time Values of Driver Discomfort," doi: 10.3390/info11080390.

V. Ramanishka, Y. T. Chen, T. Misu, and K. Saenko, "Toward Driving Scene Understanding: A Dataset for Learning Driver Behavior and Causal Reasoning," Proc. IEEE Comput. Soc. Conf. Comput. Vis. Pattern Recognit., pp. 7699-7707, Nov. 2018, doi: 10.1109/CVPR.2018.00803.

B. A. Shiferaw et al., "Stationary gaze entropy predicts lane departure events in sleep-deprived drivers OPEN," doi: 10.1038/s41598-018-20588-7.

Shimmer, "Shimmer3 GSR+ Unit," [Online]. Available: https://shimmersensing.com/product/shimmer3-gsr-unit/.

F. W. Siebert, M. Oehl, R. Hoger, and H. R. Pfister, "Discomfort in Automated Driving—The Disco-Scale," Commun. Comput. Inf. Sci., vol. 374, No. Part II, pp. 337-341, 2013, doi: 10.1007/978-3-642-39476-8_69.

M. Slovick, "World's First Level 3 Self-Driving Production Car Now Availabel in Japan," 2021. [Online]. Available: https://www.electronicdesign.com/markets/automotive/article/21158656/electronic-design-worlds-first-level-3-selfdriving-production-car-now-available-in-japan.

Y. S. Son, W. Kim, S. H. Lee, and C. C. Chung, "Robust multirate control scheme with predictive virtual lanes for lane-keeping system of autonomous highway driving," IEEE Trans. Veh. Technol., vol. 64, No. 8, pp. 3378-3391, Aug. 2015, doi: 10.1109/TVT.2014.2356204.

Tobii Pro, "Tobii Pro Nano." https://www.tobiipro.com/product-listing/nano/.

B. Zhang, J. de Winter, S. Varotto, R. Happee, and M. Martens, "Determinants of take-over time from automated driving: A meta-analysis of 129 studies," Transp. Res. Part F Traffic Psychol. Behav., vol. 64, pp. 285-307, Jul. 2019, doi: 10.1016/J.TRF.2019.04.020.

B. Zhou et al., "Semantic Understanding of Scenes through the ADE20K Dataset." [Online]. Available: http://groups.csail.mit.edu/vision/datasets/ADE20K.Pretrainedmodelsandcodearereleasedathttps://github.com/CSAILVision/semantic-segmentation-pytorch.

* cited by examiner

| | MODALITY | FEATURE | EXPLANATION |
|---|---|---|---|
| 302 | PHYSIO FEATURES | $HR_{min}$ $HR_{max}$ $HR_{avg}$ $HR_{std}$ | MINIMUM, MAXIMUM, MEAN AND STANDARD DEVIATION OF HEART RATE LEVEL |
| | | $GSR_{min}$ $GSR_{max}$ $GSR_{avg}$ $GSR_{std}$ | MINIMUM, MAXIMUM, MEAN AND STANDARD DEVIATION OF GALVANIC SKIN RESPONSE LEVELS |
| | | HR GSR | HEART RATE AND SKIN CONDUCTANCE LEVELS |
| 304 | GAZE FEATURES | $x_{gaze}$ $y_{gaze}$ | EYE GAZE FIXATION POSITIONS |
| | | $d_{left}$ ... $d_{right}$ | PUPIL DIAMETERS |
| | | $o_{gaze}$ ... $o_{gaze}$ | GAZE OBJECT OF FIXATION |
| | | $P_{object\ 1}$ $P_{object\ n}$ | PERCENTAGES OF GAZE ON EACH OBJECT |
| | | $H_{region}$ | EYE GAZE REGION ENTROPY |
| | | $H_{object}$ | EYE GAZE OBJECT ENTROPY |
| 306 | DYNAMIC FEATURES | $\theta_{object\ 1}$ $\omega_{object\ n}$ | STEERING ANGLE, STEERING SPEED |
| | | $P_{throttle}$ $P_{brake}$ | THROTTLE AND BROKE PEDAL ANGLES |
| | | $v_{car}$ $a_{car}$ | SPEED AND ACCELERATION |
| | | min max avg std | MINIMUM, MAXIMUM, MEAN AND STANDARD DEVIATION OF ABOVE FEATURES |
| 308 | ENV. FEATURES | $x_{car}$ $y_{car}$ $x_{bike}$ $y_{bike}$ $x_{ped}$ $y_{ped}$ | POSITIONS OF THE CLOSEST CAR, BIKE AND PEDESTRIAN |
| | | $left_{avail}$ $left_{dis}$ $right_{avail}$ $right_{dis}$ | LANE AVAILABILITY AND LANE DISTANCES |
| 310 | DRIVING INTENTION FEATURES | $goal_i$ $cause_i$ $attention_i$ | ANNOTATION OF OPERATION GOALS CAUSE AND ATTENTION |

FIG. 3

SYSTEM AND METHOD FOR DETECTING A PERCEIVED LEVEL OF DRIVER DISCOMFORT IN AN AUTOMATED VEHICLE

BACKGROUND

Recent automotive industry technological innovations have led to the development of numerous advanced driver assistance systems. Currently, many vehicles on the road are equipped with automation features such as adaptive cruise control, lane keeping, collision avoidance, and automatic parking. These automation features may provide sustained hands/pedals-off lateral and longitudinal vehicle control. Automation may reduce driver workload and maneuvers and may lead to increased comfort. For example, in scenarios like highway driving and parking, drivers may merely need to monitor the ride and takeover vehicle control in particular limited circumstances. However, since various automated controllers may provide different driving styles that may not be in synchrony with the preferred driving styles of drivers this may result in a loss of driver's trust and comfort in the automated vehicles. In such situations, drivers may prefer to takeover and manually control the vehicle.

BRIEF DESCRIPTION

According to one aspect, a computer-implemented method for detecting a perceived level of driver discomfort in an automated vehicle. The computer-implemented method includes receiving image data associated with a driving scene of an ego vehicle, dynamic data associated with an operation of the ego vehicle, and driver data associated with a driver of the ego vehicle during autonomous operation of the ego vehicle. The computer-implemented method also includes analyzing the image data, the dynamic data, and the driver data and extracting features associated with a plurality of modalities that pertain to the driving scene of the ego vehicle, dynamic operation of the ego vehicle, and the driver of the ego vehicle during the autonomous operation of the ego vehicle. The computer-implemented method additionally includes analyzing the extracted features and detecting the perceived level of driver discomfort. The computer-implemented method further includes analyzing the perceived level of driver discomfort and detecting a probable driver takeover intent of the driver of the ego vehicle to takeover manual operation of the ego vehicle. At least one system of the ego vehicle is controlled based on the probable driver takeover intent.

According to another aspect, a system is provided for detecting a perceived level of driver discomfort in an automated vehicle. The system includes a memory storing instructions that when executed by a processor cause the processor to execute the instructions. The instructions include receiving image data associated with a driving scene of an ego vehicle, dynamic data associated with an operation of the ego vehicle, and driver data associated with a driver of the ego vehicle during autonomous operation of the ego vehicle. The instructions also include analyzing the image data, the dynamic data, and the driver data and extracting features associated with a plurality of modalities that pertain to the driving scene of the ego vehicle, dynamic operation of the ego vehicle, and the driver of the ego vehicle during the autonomous operation of the ego vehicle. The instructions additionally include analyzing the extracted features and detecting the perceived level of driver discomfort. The instructions further include analyzing the perceived level of driver discomfort and detecting a probable driver takeover intent of the driver of the ego vehicle to takeover manual operation of the ego vehicle. At least one system of the ego vehicle is controlled based on the probable driver takeover intent.

According to yet another aspect, a non-transitory computer readable storage medium storing instructions that are executed by a computer, which includes a processor. The instructions perform a method. The method includes receiving image data associated with a driving scene of an ego vehicle, dynamic data associated with an operation of the ego vehicle, and driver data associated with a driver of the ego vehicle during autonomous operation of the ego vehicle. The method also includes analyzing the image data, the dynamic data, and the driver data and extracting features associated with a plurality of modalities that pertain to the driving scene of the ego vehicle, dynamic operation of the ego vehicle, and the driver of the ego vehicle during the autonomous operation of the ego vehicle. The method additionally includes analyzing the extracted features and detecting the perceived level of driver discomfort. The method further includes analyzing the perceived level of driver discomfort and detecting a probable driver takeover intent of the driver of the ego vehicle to takeover manual operation of the ego vehicle. At least one system of the ego vehicle is controlled based on the probable driver takeover intent.

BRIEF DESCRIPTION OF THE DRAWINGS

The novel features believed to be characteristic of the disclosure are set forth in the appended claims. In the descriptions that follow, like parts are marked throughout the specification and drawings with the same numerals, respectively. The drawing figures are not necessarily drawn to scale and certain figures can be shown in exaggerated or generalized form in the interest of clarity and conciseness. The disclosure itself, however, as well as a preferred mode of use, further objects and advances thereof, will be best understood by reference to the following detailed description of illustrative embodiments when read in conjunction with the accompanying drawings, wherein:

FIG. 3 is an illustrative example of the features that are extracted based on sensor based data according to an exemplary embodiment of the present disclosure;

DETAILED DESCRIPTION

Figure 1:
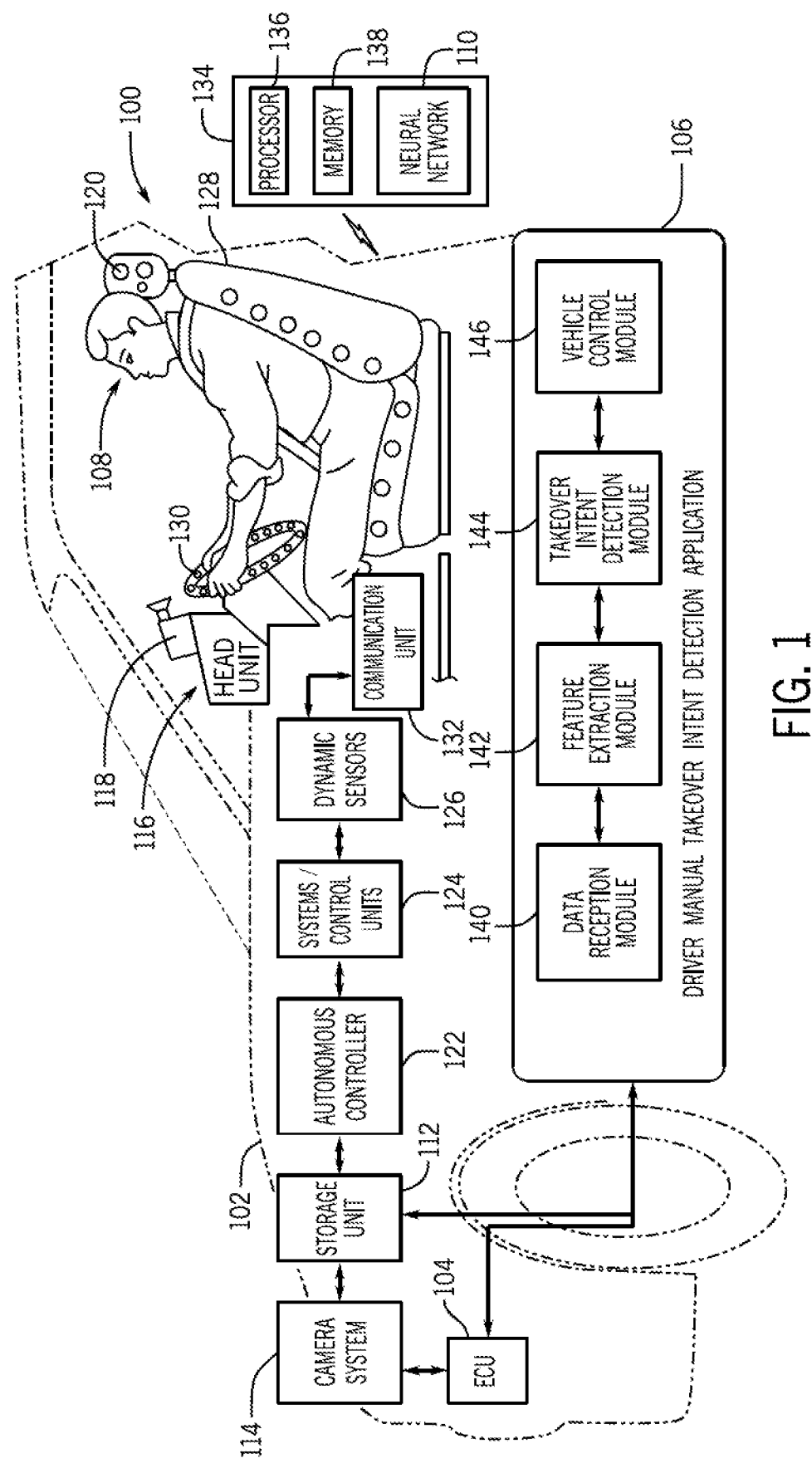
FIG. 1 is a schematic view of an exemplary system for detecting a perceived level of driver discomfort in an automated vehicle (ego vehicle) according to an exemplary embodiment of the present disclosure.

The following includes definitions of selected terms employed herein. The definitions include various examples and/or forms of components that fall within the scope of a term and that may be used for implementation. The examples are not intended to be limiting.

A "bus", as used herein, refers to an interconnected architecture that is operably connected to other computer components inside a computer or between computers. The bus may transfer data between the computer components. The bus may be a memory bus, a memory controller, a peripheral bus, an external bus, a crossbar switch, and/or a local bus, among others. The bus can also be a vehicle bus that interconnects components inside a vehicle using protocols such as Media Oriented Systems Transport (MOST), Controller Area network (CAN), Local Interconnect Network (LIN), among others.

"Computer communication", as used herein, refers to a communication between two or more computing devices (e.g., computer, personal digital assistant, cellular telephone, network device) and can be, for example, a network transfer, a file transfer, an applet transfer, an email, a hypertext transfer protocol (HTTP) transfer, and so on. A computer communication can occur across, for example, a wireless system (e.g., IEEE 802.11), an Ethernet system (e.g., IEEE 802.3), a token ring system (e.g., IEEE 802.5), a local area network (LAN), a wide area network (WAN), a point-to-point system, a circuit switching system, a packet switching system, among others.

A "disk", as used herein can be, for example, a magnetic disk drive, a solid-state disk drive, a floppy disk drive, a tape drive, a Zip drive, a flash memory card, and/or a memory stick. Furthermore, the disk can be a CD-ROM (compact disk ROM), a CD recordable drive (CD-R drive), a CD rewritable drive (CD-RW drive), and/or a digital video ROM drive (DVD ROM). The disk can store an operating system that controls or allocates resources of a computing device.

A "memory", as used herein can include volatile memory and/or non-volatile memory. Non-volatile memory can include, for example, ROM (read only memory), PROM (programmable read only memory), EPROM (erasable PROM), and EEPROM (electrically erasable PROM). Volatile memory can include, for example, RAM (random access memory), synchronous RAM (SRAM), dynamic RAM (DRAM), synchronous DRAM (SDRAM), double data rate SDRAM (DDR SDRAM), and direct RAM bus RAM (DRRAM). The memory can store an operating system that controls or allocates resources of a computing device.

A "module", as used herein, includes, but is not limited to, non-transitory computer readable medium that stores instructions, instructions in execution on a machine, hardware, firmware, software in execution on a machine, and/or combinations of each to perform a function(s) or an action(s), and/or to cause a function or action from another module, method, and/or system. A module may also include logic, a software-controlled microprocessor, a discreet logic circuit, an analog circuit, a digital circuit, a programmed logic device, a memory device containing executing instructions, logic gates, a combination of gates, and/or other circuit components. Multiple modules may be combined into one module and single modules may be distributed among multiple modules.

An "operable connection", or a connection by which entities are "operably connected", is one in which signals, physical communications, and/or logical communications may be sent and/or received. An operable connection may include a wireless interface, a physical interface, a data interface and/or an electrical interface.

A "processor", as used herein, processes signals and performs general computing and arithmetic functions. Signals processed by the processor may include digital signals, data signals, computer instructions, processor instructions, messages, a bit, a bit stream, or other means that may be received, transmitted and/or detected. Generally, the processor may be a variety of various processors including multiple single and multicore processors and co-processors and other multiple single and multicore processor and co-processor architectures. The processor may include various modules to execute various functions.

A "vehicle", as used herein, refers to any moving vehicle that is capable of carrying one or more human occupants and is powered by any form of energy. The term "vehicle" includes, but is not limited to: cars, trucks, vans, minivans, SUVs, motorcycles, scooters, boats, go-karts, amusement ride cars, rail transport, personal watercraft, and aircraft. In some cases, a motor vehicle includes one or more engines. Further, the term "vehicle" may refer to an electric vehicle (EV) that is capable of carrying one or more human occupants and is powered entirely or partially by one or more electric motors powered by an electric battery. The EV may include battery electric vehicles (BEV) and plug-in hybrid electric vehicles (PHEV). The term "vehicle" may also refer to an autonomous vehicle and/or self-driving vehicle powered by any form of energy. The autonomous vehicle may or may not carry one or more human occupants. Further, the term "vehicle" may include vehicles that are automated or non-automated with pre-determined paths or free-moving vehicles.

A "value" and "level", as used herein may include, but is not limited to, a numerical or other kind of value or level such as a percentage, a non-numerical value, a discrete state, a discrete value, a continuous value, among others. The term "value of X" or "level of X" as used throughout this detailed description and in the claims refers to any numerical or other kind of value for distinguishing between two or more states of X. For example, in some cases, the value or level of X may be given as a percentage between 0% and 100%. In other cases, the value or level of X could be a value in the range between 1 and 10. In still other cases, the value or level of X may not be a numerical value, but could be associated with a given discrete state, such as "not X", "slightly x", "x", "very x" and "extremely x".

I. System Overview

Referring now to the drawings, wherein the showings are for purposes of illustrating one or more exemplary embodiments and not for purposes of limiting same, FIG. 1 is a detecting a perceived level of driver discomfort in an automated vehicle 102 (ego vehicle) according to an exemplary embodiment of the present disclosure. The components of the system 100, as well as the components of other systems, hardware architectures, and software architectures discussed herein, may be combined, omitted, or organized into different architectures for various embodiments.

Generally, the ego vehicle 102 includes a plurality of components (described in detail below) that are operably controlled by an electronic control unit (ECU) 104 that executes one or more applications, operating systems, vehicle system and subsystem user interfaces, among others. The ECU 104 may also execute a driver manual takeover intent detection application (takeover detection application) 106 that may be configured to detect a probable driver takeover intent to takeover manual control of the operation of the ego vehicle 102 from an autonomous operating state.

The takeover detection application 106 may be configured to detect a driver's preference to takeover manual control of the ego vehicle 102 to implement one or more controls to counter a loss of driver's trust and comfort as the ego vehicle 102 is being autonomously operated. In particular, the takeover detection application 106 may be configured to detect a perceived level of driver discomfort that may occur during one or more timeframes as the ego vehicle 102 is being autonomously operated. The perceived level of discomfort may be associated with one or more autonomous driving maneuvers that may be completed during the autonomous operation of the ego vehicle 102 within a driving scene (shown in FIG. 2) of the ego vehicle 102.

In an exemplary embodiment, upon detecting a perceived level of driver discomfort during the autonomous operation of the ego vehicle 102, the takeover detection application 106 may be configured to analyze the perceived level of driver discomfort to further detect if the driver 108 may intend to takeover manual control of the operation of the ego vehicle 102 (thereby disabling the automated operation of the ego vehicle 102 to complete one or more driving maneuvers). This functionality may be executed to thereby minimize any potential motivation that is driven by driver discomfort that may cause the driver 108 to take over manual control of the ego vehicle 102 from an autonomous operating state of the ego vehicle 102. This functionality may additionally increase driver trust with respect to the autonomous operation of the ego vehicle 102 which may have an impact on lowering driver discomfort over a period of time.

The takeover detection application 106 may be configured to analyze the multimodal data to detect a perceived level of driver discomfort that may occur during one or more timeframes as the ego vehicle 102 is being autonomously operated. The perceived level of driver discomfort may be further analyzed by the takeover detection application 106 to detect a takeover intent of the driver 108 of the ego vehicle 102 to takeover manual operation of the ego vehicle 102 at one or more future points in time. Accordingly, one or more systems of the ego vehicle 102 may be controlled by the takeover detection application 106 to minimize driver discomfort to thereby minimize the preference for the driver 108 to take over manual control of the ego vehicle 102 from an autonomous operating state.

In one or more embodiments, the takeover detection application 106 may be configured to train a deep neural network 110 (neural network) with data pertaining to a plurality of modalities associated with the driving scene of the ego vehicle 102, the dynamic operation of the ego vehicle 102, and the driver 108 of the ego vehicle 102. In some embodiments, the training of the neural network 110 may be utilized by the takeover detection application 106 to extract features associated with the plurality of modalities that may be derived by various sensors of the ego vehicle 102. In additional embodiments, the training of the neural network 110 may be utilized by the takeover detection application 106 to detect a takeover intent of the driver 108 of the ego vehicle 102 at one or more future points in time when the ego vehicle 102 is being operated in the driving scene that may be similar with respect to a road layout, environment, a number and position of objects, and/or based on the dynamic operation of the ego vehicle 102 which may be similar to data previously trained to the neural network 110.

Figure 2:
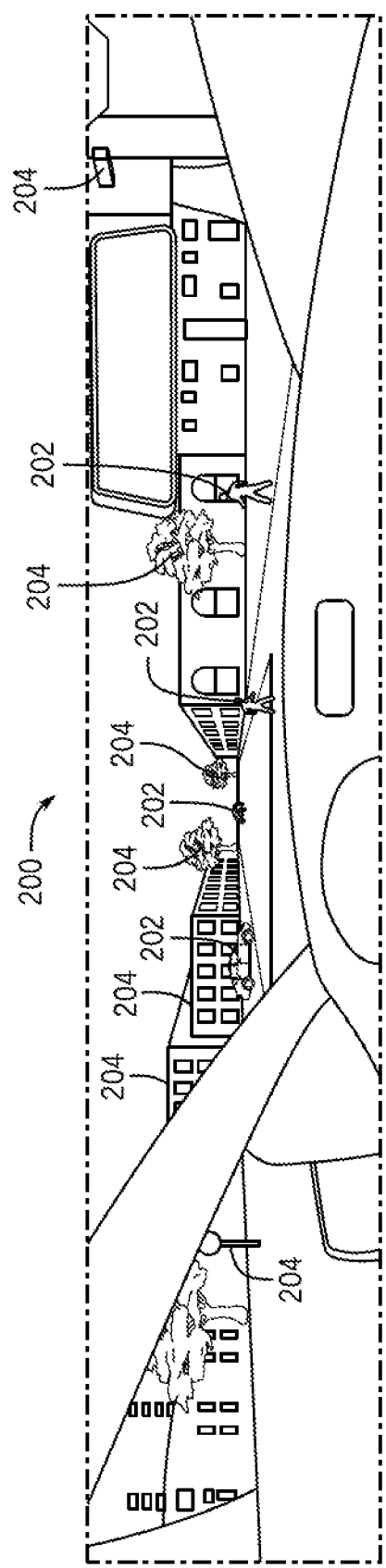
FIG. 2 is an illustrative example of a driving scene of the ego vehicle according to an exemplary embodiment of the present disclosure.

As shown in the illustrative example of FIG. 2, the ego vehicle 102 may be operated in the driving scene 200 of the ego vehicle 102 which may include roadways, intersections, sidewalks, dynamic objects 202 (e.g., pedestrians, other vehicles, etc.), and static objects 204 (e.g., traffic posts, traffic lights, buildings, trees, guardrails, etc.). In one embodiment, as the ego vehicle 102 is being autonomously operated within the driving scene 200, data may be captured regarding the driving scene 200 of the ego vehicle 102.

As discussed in more detail below, the takeover detection application 106 may be configured to utilize a camera system 114 of the ego vehicle 102 to receive image data associated with images of the driving scene 200. The takeover detection application 106 may be configured to classify objects located within the driving scene 200 as particular types of dynamic objects 202 and static objects 204 and may further determine the position of dynamic objects 202 that may be traveling within the driving scene 200. The analysis of image data and classification of objects 202, 204 may enable the takeover detection application 106 to extract environment features that may pertain to the driving scene 200 of the ego vehicle 102.

The takeover detection application 106 may also be configured to communicate with dynamic sensors 126 of the ego vehicle 102 to receive dynamic data associated with the dynamic operation of the ego vehicle 102 as its being autonomously operated within the driving scene 200. As discussed below, the dynamic operation of the ego vehicle 102 may be analyzed by the takeover detection application 106 to extract dynamic features that may pertain to various dynamic parameters associated with the real-time autonomous operation of the ego vehicle 102.

The takeover detection application 106 may also be configured to analyze multimodal data associated with the driver 108 of the ego vehicle 102 that may include, but may not be limited to data associated with the driver's eye gaze that may be received by eye gaze sensors 118 of the ego vehicle 102. The eye gaze data may be analyzed by the takeover detection application 106 to extract eye gaze features associated with the driver's eye gaze focus as the ego vehicle 102 is being operated within the driving scene 200.

In an exemplary embodiment, the takeover detection application 106 may be configured to receive physiological data associated with a physiological state of the driver 108 that may be captured by physiological sensors 120 of the ego vehicle 102 as the ego vehicle 102 is being autonomously driven. The physiological data may be analyzed by the takeover detection application 106 to extract physiological features that may be associated with the driver's physiological state during the operation of the ego vehicle 102 within the driving scene 200. In one configuration, the extracted physiological features may be analyzed to determine physiological spikes that may be associated with a physiological state of the driver 108 as the ego vehicle 102 is being autonomously operated within the driving scene 200.

In some embodiments, the multimodal data may also pertain to intentions of the driver 108 that may be determined based on the driver's eye gaze, operating goals of the ego vehicle 102 that may be associated with an intended destination of the driver 108, and/or a cause (e.g., a pedestrian crossing the street, a traffic sign) to extract driving intention features. The driving intention features may pertain to intentions of the driver 108 that may be determined based on the driver's eye gaze, manual driving maneuvers, and/or a cause (e.g., a pedestrian crossing the street, a traffic sign) associated with the important objects that may impact the driver's decision to manually takeover operation of the ego vehicle 102.

The takeover detection application 106 may be configured to provide an improvement to the technology of autonomous vehicle operation by detecting driver discomfort with respect how physiological spikes and/or real time driver takeover events may influence driver takeovers of autonomous operations of autonomous vehicles to minimize driver discomfort. The takeover detection application 106 may be configured to provide efficient computing processing of takeover detection by training the neural network 110 with respect to a multimodal dataset (not shown) that may pertain to various types of driving scenes.

With continued reference to FIG. 1, the ECU 104 may be configured to be operably connected to a plurality of components of the ego vehicle 102, including, but not limited to, a storage unit 112, the camera system 114, a head unit 116, the eye gaze sensors 118, the physiological sensors 120, an autonomous controller 122, systems/control units 124, dynamic sensors 126, and a communication unit 132 of the ego vehicle 102. However, it is appreciated that one or more components of the ego vehicle 102 that are not shown in FIG. 1 may also be operably controlled by the ECU 104. In one or more embodiments, the ECU 104 may include a microprocessor, one or more application-specific integrated circuit(s) (ASIC), or other similar devices. The ECU 104 may also include internal processing memory, an interface circuit, and bus lines for transferring data, sending commands, and communicating with the plurality of components of the ego vehicle 102.

The ECU 104 may also include a communication device (not shown) for sending data internally within (e.g., between one or more components) the ego vehicle 102 and communicating with externally hosted computing systems (e.g., external to the ego vehicle 102). Generally, the ECU 104 may communicate with the storage unit 112 to execute the one or more applications, operating systems, vehicle system and subsystem user interfaces, and the like that are stored within the storage unit 112.

In one embodiment, the ECU 104 may communicate with the autonomous controller 122 to execute autonomous driving commands to operate the ego vehicle 102 to be fully autonomously driven or semi-autonomously driven in a particular manner. As discussed below, the autonomous driving commands may be provided during an autonomous operation mode of the ego vehicle 102 and may be altered based on commands provided by the takeover detection application 106 to autonomously control one or more functions of the ego vehicle 102 based on a detected probable takeover of the manual operation of the ego vehicle 102 by the driver 108 of the ego vehicle 102.

As discussed below, the autonomous controller 122 may be configured to autonomously control the ego vehicle 102 to operate in a manner based on one or more commands that are output by the takeover detection application 106. In particular, the autonomous driving commands may be provided to the autonomous controller 122 of the ego vehicle 102 to operate the ego vehicle 102 in a manner that may minimize driver discomfort to thereby minimize the preference for the driver 108 to take over manual control of the ego vehicle 102 from an autonomous operating state. Accordingly, one or more commands may be sent to the autonomous controller 122 to ensure that the ego vehicle 102 is autonomously operated to complete acceleration, braking, turning, and/or steering in a way that may ease/lessen/minimize the driver's perceived level of discomfort during the autonomous operation of the ego vehicle 102 to thereby minimize any potential motivation that is driven by driver discomfort that may cause for the driver 108 to take over manual control of the ego vehicle 102 from an autonomous operating state.

In one or more embodiments, the autonomous controller 122 may autonomously control the operation of the ego vehicle 102 by providing one or more commands to one or more of the systems/control units 124 to provide full autonomous or semi-autonomous control of the ego vehicle 102 to follow vehicle autonomous commands provided by the application 106. Such autonomous control of the ego vehicle 102 may be provided by sending one or more commands to control one or more of the systems/control units 124 to operate (e.g., drive) the ego vehicle 102 during one or more circumstances (e.g., when providing driver assist controls), and/or to fully control driving of the ego vehicle 102.

The one or more commands may be provided to one or more systems/control units 124 that include, but are not limited to an engine control unit, a motor control unit, a braking control unit, a transmission control unit, a steering control unit, and the like to control the ego vehicle 102 to be autonomously driven based on one or more commands that are output by the autonomous controller 122 of the ego vehicle 102 and/or the takeover detection application 106. The one or more systems/control units 124 may provide autonomous control and/or semi-autonomous control to assist in navigating the ego vehicle 102 within the driving scene 200 of the ego vehicle 102 while accounting for one or more dynamic objects 202 that may be located within the driving scene 200 of the ego vehicle 102.

In one or more embodiments, the ECU 104 may also communicate with the head unit 116 to execute the one or more applications, operating systems, vehicle system and subsystem user interfaces, and the like that are stored within the storage unit 112. The head unit 116 may be configured to include one or more display devices (not shown) (e.g., center stack display device, head-up display) and audio devices (e.g., speakers) (not shown) that may be associated with one or more Advanced Driving Assistance Systems (ADAS systems) (not shown).

The one or more ADAS systems may provide ADAS alerts, notifications, and/or warnings to the driver 108 of the ego vehicle 102 through the head unit 116 of the ego vehicle 102. In particular, the one or more ADAS systems may provide ADAS alerts that pertain to dynamic objects 202 that may be within a particular distance of the ego vehicle 102, within a blind spot of the driver 108 of the ego vehicle 102, and/or within a projected path of the ego vehicle 102. Such ADAS alerts may include graphical alerts or audio alerts that may be provided to alert the driver 108 of the presence of such dynamic objects 202.

In one or more embodiments, the head unit 116 may be configured to provide ADAS notifications to the driver 108 of the ego vehicle 102 based on one or more executable command instructions that may be communicated by the takeover detection application 106. In particular, the one or more executable commands may be communicated from the takeover detection application 106 to the head unit 116 to provide one or more notifications to the driver 108 of the ego vehicle 102 in a manner that may minimize driver discomfort to thereby minimize the preference for the driver 108 to take over manual control of the ego vehicle 102 from an autonomous operating state.

Accordingly, one or more commands may be sent to the head unit 116 may provide information pertaining to the driving scene 200, one or more autonomous driving maneuvers, and/or information pertaining to dynamic objects 202 that may be located within the driving scene 200 to ensure that the driver 108 is fully apprised of information that may relate to particular autonomous maneuvers of the ego vehicle 102 when it is determined that there may be a heighted level of perceived driver discomfort during the autonomous operation of the ego vehicle 102. This functionality may thereby minimize motivation that the driver 108 may have to take over manual control of the ego vehicle 102 from an autonomous operating state that pertains to the types of alerts and the reasons for such alerts associated with one or more dynamic objects 202 (e.g., presence of a particular dynamic object 202 within a close distance to the ego vehicle 102) that may be provided to the driver 108 at one or more particular points in time.

In one or more embodiments, the systems/control units 124 may be operably connected to the dynamic sensors 126 of the ego vehicle 102. The dynamic sensors 126 may be configured to receive inputs from one or more vehicle systems, sub-systems, control systems, and the like. In one embodiment, the dynamic sensors 126 may be included as part of a Controller Area Network (CAN) of the ego vehicle 102 and may be configured to provide dynamic data to the ECU 104 to be utilized for one or more vehicle systems, sub-systems, control systems, and the like. The dynamic sensors 126 may include, but may not be limited to, position sensors, heading sensors, speed sensors, steering speed sensors, steering angle sensors, throttle angle sensors, accelerometers, magnetometers, gyroscopes, yaw rate sensors, brake force sensors, wheel speed sensors, wheel turning angle sensors, transmission gear sensors, temperature sensors, RPM sensors, GPS/DGPS sensors, and the like (individual sensors not shown).

In one configuration, the dynamic sensors 126 may provide dynamic data in the form of one or more values (e.g., numeric levels) that are associated with the real-time dynamic performance of the ego vehicle 102 as the ego vehicle 102 is operated. As discussed below, the dynamic data that is output by the dynamic sensors 126 that is associated with a real time dynamic operation of the ego vehicle 102 as it is traveling within the driving scene 200 may be analyzed by the takeover detection application 106 to determine dynamic features associated with the operation of the ego vehicle 102.

With continued reference to FIG. 1, the camera system 114 may include one or more of the cameras (not shown) that may be positioned in one or more directions and at one or more areas to capture one or more images of the driving scene 200 of the ego vehicle 102 (e.g., images of the roadway on which the ego vehicle 102 is traveling). The one or more cameras of the camera system 114 may be disposed at external front portions of the ego vehicle 102, including, but not limited to different portions of a vehicle dashboard, a vehicle bumper, vehicle front lighting units, vehicle fenders, and a vehicle windshield. In one embodiment, the one or more cameras may be configured as RGB cameras that may capture RGB bands that are configured to capture rich information about object appearance, as well as relationships and interactions between the ego vehicle 102 and objects 202, 204 within the driving scene 200 of the ego vehicle 102.

In other embodiments, the one or more cameras may be configured as stereoscopic cameras that are configured to capture environmental information in the form of three-dimensional images. In one or more configurations, the one or more cameras may be configured to capture one or more first person viewpoint RGB images/videos of the driving scene 200. The camera system 114 may be configured to convert one or more RGB images/videos (e.g., sequences of images) into image data that is communicated to the takeover detection application 106 to be analyzed. As discussed below, the takeover detection application 106 may be configured to analyze the image data and determine environment features that may be associated with the driving scene 200 of the ego vehicle 102 during the real time autonomous operation of the ego vehicle 102.

In an exemplary embodiment, the eye gaze sensors 118 may be configured as one or more cameras located within the ego vehicle 102 and hardware configured to interpret video or image data sensed by the camera(s) to detect the driver's eye gaze positions within the ego vehicle 102. In an alternate embodiment, the eye gaze sensors 118 may be included as part of a wearable device (e.g., wearable glasses) that may be configured to detect the driver's eye positions within the ego vehicle 102 in order to determine the driver's gaze positions as the ego vehicle 102 is being operated within the driving scene 200. The driver's gaze points may pertain to the driver's focus with respect a focal point of the driver's vision of the driving scene 200 of the ego vehicle 102.

In one embodiment, the eye gaze sensors 118 may communicate eye gaze data that pertains to the driver's gaze focus with respect to the driver's vision of the driving scene 200 to the takeover detection application 106. The takeover detection application 106 may be configured to analyze the eye gaze data that pertains the driver's focus of vision of the driving scene 200 and may determine eye gaze features. The eye gaze features may pertain to the driver's eye gaze points with respect to various portions of the driving scene 200, one or more objects 202, 204 that may be located within the driving scene 200, and/or one or more portions of the ego vehicle 102 (e.g., an internal cabin of the ego vehicle 102) during the operation of the ego vehicle 102.

In an exemplary embodiment, the physiological sensors 120 may be configured to sense physiological parameters that may be associated with the driver 108 of the ego vehicle 102. In one configuration, the physiological sensors 120 may be disposed within a driver's seat 128 of the ego vehicle 102 and/or within a steering wheel 130 of the ego vehicle 102. In alternate configurations, the physiological sensors 120 may be included within a wearable device (not shown) (e.g., wearable smart watch) that may be worn by the driver 108 of the ego vehicle 102.

In one or more embodiments, the physiological sensors 120 may be configured to include, but may not be limited to, skin conduction sensors, electric current/potential (e.g., proximity sensors, inductive, capacitive), ultrasonic (e.g., piezoelectric, electrostatic), vibration, optical, vision, photoelectric or oxygen sensors, among others. The physiological sensors 120 may be configured to sense data associated with the driver's physiological state based on physiological data that may be sensed by one or more types of physiological sensors 120. For example, various types of physiological data that may be sensed by the physiological sensors 120 may include, but may not be limited to, skin conduction measurements that are based on the measurement of skin conductance from two or more points of the driver's skin, heart information, such as, heart rate, blood pressure, blood flow, oxygen content, respiration rate information, as well as other kinds of information related to the autonomic nervous system or other biological systems of the driver 108.

In an exemplary embodiment, the physiological sensors 120 may be configured to sense and output one or more data signals indicating one or more measurements of physiological information in the form of physiological data to the takeover detection application 106. The takeover detection application 106 may be configured to analyze the physiological data that pertains to the driver's physiological data and may determine physiological features that may pertain to the driver's physiological state, physiological measurements, and/or physiological spikes associated with the driver 108 of the ego vehicle 102 during the real-time autonomous operation of the ego vehicle 102.

In one embodiment, the communication unit 132 of the ego vehicle 102 may be operably controlled by the ECU 104 of the ego vehicle 102. The communication unit 132 may be operably connected to one or more transceivers (not shown) of the ego vehicle 102. The communication unit 132 may be configured to communicate through an internet cloud (not shown) through one or more wireless communication signals that may include, but may not be limited to Bluetooth® signals, Wi-Fi signals, ZigBee signals, Wi-Max signals, and the like.

In an exemplary embodiment, the communication unit 132 may be configured to send and/or receive data to/from neural network 110 through an externally hosted server infrastructure (external server) 134 that may host the neural network 110. As discussed, the neural network 110 may be trained with data pertaining to the multimodal data. In some embodiments, the training of the neural network 110 may be utilized by the takeover detection application 106 to extract features associated with the driving scene, the driver 108, the driver's takeover intentions, and/or the dynamic operation of the ego vehicle 102.

A processor 136 of the external server 134 may be utilized to provide processing capabilities to enable the neural network 110 to provide machine learning/deep learning techniques to output data to the takeover detection application 106 based on the analysis of sensor based data by the neural network 110. In one embodiment, the neural network 110 and/or one or more datasets that may be trained and utilized by the neural network 110 may be stored upon a memory 138 of the external server 134. The memory 138 may also be configured to store one or more operating systems, applications, associated operating system data, application data, executable data, and the like. In some embodiments, the memory 138 may be configured to store executable application data filed associated with the takeover detection application 106.

II. The Driver Manual Takeover Intent Detection Application and Related Methods

The components of the takeover detection application 106 will now be described according to an exemplary embodiment and with reference to FIG. 1. In an exemplary embodiment, the takeover detection application 106 may be stored on the storage unit 112 and may be executed by the ECU 104 of the ego vehicle 102. In another embodiment, the takeover detection application 106 may be stored on the memory 138 of the external server 134 and may be executed by the processor 136 of the external server 134.

The general functionality of the takeover detection application 106 will now be discussed. In an exemplary embodiment, the takeover detection application 106 may include a plurality of modules 140-146 that may be configured to detect a probable driver takeover intent based on features associated with a plurality of modalities, physiological spikes of the driver 108 of the ego vehicle 102, takeover events by the driver 108 with respect to the manual operation of the ego vehicle 102, and additional information, as discussed below. The plurality of modules 140-146 may include a data reception module 140, a feature extraction module 142, a takeover intent detection module 144, and a vehicle control module 146. However, it is appreciated that the takeover detection application 106 may include one or more additional modules and/or sub-modules that are included in lieu of the modules 140-146.

FIG. 3 is an illustrative example of the features 302-310 that are extracted based on sensor based data according to an exemplary embodiment of the present disclosure. As discussed, the feature extraction module 142 of the takeover detection application 106 may be configured to analyze sensor data that may be received by the data reception module 140 of the takeover detection application 106 to extract features associated with a plurality of modalities that pertain to the driving scene 200 of the ego vehicle 102, the operation of the ego vehicle 102, and to the driver 108 of the ego vehicle 102.

As discussed in more detail below, upon extraction of these features by the feature extraction module 142, the takeover intent detection module 144 of the takeover detection application 106 may be configured to analyze the extracted features that may include but may not be limited to physiological features 302, eye gaze features 304, dynamic features 306, environment features 308, and driving intention features 310 to detect a perceived level of driver discomfort that may be associated with the driver 108 that may occur during one or more timeframes as the ego vehicle 102 is being autonomously operated. The perceived level of driver discomfort may be further analyzed by the takeover intent detection module 144 to detect a probable driver takeover intent of the driver 108 to takeover manual operation of the ego vehicle 102 during one or more future points in time (t+1, t+2, t+n).

Upon detection of the takeover intent of the driver 108 of the ego vehicle 102, the vehicle control module 146 of the takeover detection application 106 may be configured to analyze the driving scene 200, positions and classifications of objects 202, 204 that are located within the driving scene 200, and/or dynamic characteristics of the operation of the ego vehicle 102. The vehicle control module 146 may thereby send one or more commands to the autonomous controller 122 of the ego vehicle 102 to navigate the ego vehicle 102 within the driving scene 200 to autonomously control one or more functions of the ego vehicle 102 based on a detected probable takeover of the manual operation of the ego vehicle 102 by the driver 108 of the ego vehicle 102. This functionality may be executed to minimize any potential motivation that is driven by driver discomfort that may be cause for the driver 108 to take over manual control of the ego vehicle 102 from an autonomous operating state of the ego vehicle 102.

Figure 4:
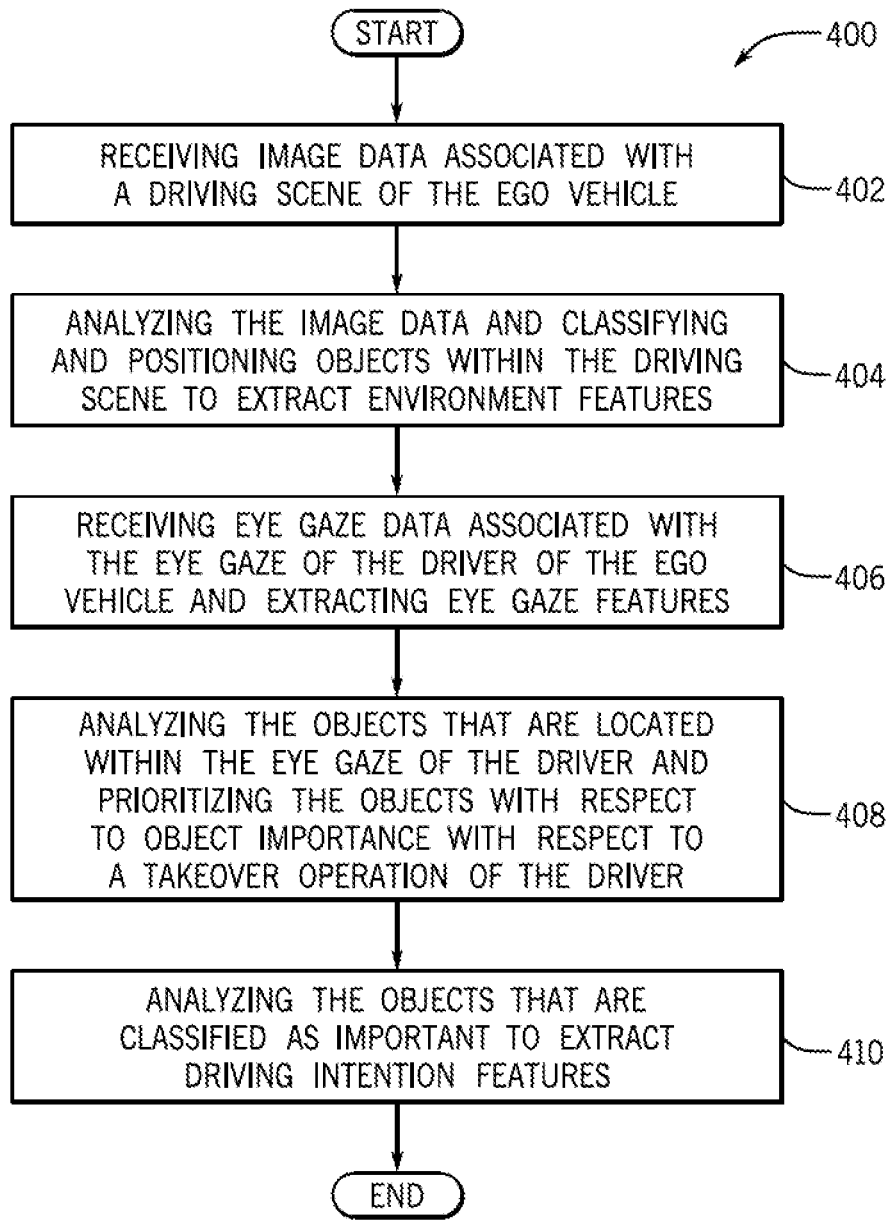
FIG. 4 is a process flow diagram of a method for receiving image data and eye gaze data and determining environment features and driving intention features according to an exemplary embodiment of the present disclosure.

FIG. 4 is a process flow diagram of a method 400 for receiving image data and eye gaze data and determining environment features 308 and driving intention features 310 according to an exemplary embodiment of the present disclosure. FIG. 4 will be described with reference to the components of FIGS. 1-3 though it is to be appreciated that the method 400 of FIG. 4 may be used with other systems/components. The method 400 may begin at block 402, wherein the method 400 may include receiving image data associated with a driving scene 200 of the ego vehicle 102.

In one embodiment, the data reception module 140 of the takeover detection application 106 may be configured to communicate with the camera system 114 to collect image data associated untrimmed images/video of the driving scene 200 of the ego vehicle 102. In some configurations, the image data may pertain to one or more first person viewpoint RGB images/videos of the driving scene 200 of the ego vehicle 102. In particular, the image data may pertain to one or more RGB images/video of the surrounding dynamic objects 202 and static objects 204 that are located within the driving scene 200 that are captured by one or more cameras that are operably connected to the camera system 114. In some embodiments, the data reception module 140 may package and store the image data on the storage unit 112 to be evaluated at one or more points in time.

The method 400 may proceed to block 404, wherein the method 400 may include analyzing the image data and classifying and positioning objects within the driving scene to extract environment features. In an exemplary embodiment, the data reception module 140 may be configured to communicate the image data received from the camera system 114 to the feature extraction module 142 of the takeover detection application 106. In one embodiment, the feature extraction module 142 may be configured to extract environment features 308 by classifying the objects 202, 204 located within the driving scene 200 and determining the relative positions of each of the objects 202, 204 with respect to the position of the ego vehicle 102.

In particular, the feature extraction module 142 may be configured to access the storage unit 112 of the ego vehicle 102 to analyze one or more object classifiers that are stored upon the storage unit 112. The one or more object classifiers may include pre-trained object classification data that may be associated with image coordinates that may pertain to specific types of static objects 204 (e.g., trees, street signs, poles, guard rails, lane markers) and specific types of dynamic objects 202 (e.g., additional vehicles, pedestrians, bicyclists) that may be analyzed to classify the dynamic objects 202 and the static objects 204 located within the driving scene 200.

In one embodiment, the feature extraction module 142 may be configured to determine a relative position of each of the dynamic objects 202 and the static objects 204 that may be located within the driving scene 200 and may output relative positional coordinates associated with the relative positions. Upon classifying the objects 202, 204 and outputting the relative positional coordinates associated with the objects 202, 204, the feature extraction module 142 may be configured to analyze the classification of objects 202, 204 and their relative positions against a pre-trained dataset of the neural network 110 and may extract environment features 308 associated with the driving scene 200 of the ego vehicle 102.

As shown in the illustrative example of FIG. 3, the environment features 308 may include, but may not be limited to, relative positions of dynamic objects 202 with respect to the ego vehicle 102, availability of travel paths within the driving scene 200, and/or lane measurements of lanes within the driving scene 200, among other features that may be extracted based on the image data of the driving scene 200. In one embodiment, upon extracting the environment features 308, the feature extraction module 142 may be configured to communicate the environment features 308 to the takeover intent detection module 144 to be further analyzed.

The method 400 may proceed to block 406, wherein the method 400 may include receiving eye gaze data associated with the eye gaze of the driver 108 of the ego vehicle 102 and extracting eye gaze features. In an exemplary embodiment, the data reception module 140 may be configured to communicate with the eye gaze sensors 118 of the ego vehicle 102 to receive eye gaze data that may be associated with the eye gaze of the driver 108 of the ego vehicle 102. The eye gaze sensors 118 may be configured as one or more cameras located within the ego vehicle 102 and hardware configured to interpret video or image data sensed by the camera(s) to detect the driver's eye positions within the ego vehicle 102 in order to determine the driver's gaze points. In one embodiment, upon receiving the eye gaze data, the data reception module 140 may be configured to communicate the eye gaze data to the feature extraction module 142 to extract eye gaze features 304.

In one or more embodiments, the feature extraction module 142 may be configured to analyze the eye gaze data against a pre-trained dataset of the neural network 110 and may extract eye gaze features 304 that pertain to eye gaze positions of the driver's eye gaze, pupil dilations, and the driver's eye gaze points with respect to various portions of the driving scene 200, one or more objects 202, 204 that may be located within the driving scene 200, and/or one or more portions of the ego vehicle 102 (e.g., an internal cabin of the ego vehicle 102) during the real time autonomous operation of the ego vehicle 102. In one configuration, the feature extraction module 142 may compute an eye gaze object entropy and region entropy using:

$$H = -\sum_{i=1}^{n} p_i \log_2 p_i$$

where n stands for the total number of objects or regions within a time window, and p stands for the chances of eye gaze fixed in the certain region or object.

Upon extracting the eye gaze features associated with the driver's eye gaze with respect to various portions of the driving scene 200, one or more objects 202, 204 that may be located within the driving scene 200, and/or one or more portions of the ego vehicle 102, the feature extraction module 142 may be configured to communicate the eye gaze features to the takeover intent detection module 144 to be further analyzed. As shown in the illustrative example of FIG. 3, the eye gaze features 304 may include, but may not be limited to, eye gaze fixation positions, pupil diameters, gaze object of fixation, eye gaze region entropy, and eye gaze object entropy, among other features that may be extracted based on the eye gaze data associated with the driver's eye gaze captured during the operation of the ego vehicle 102.

With continued reference to the method 400 of FIG. 4, the method 400 may proceed to block 408, wherein the method 400 may include analyzing the objects 202, 204 that are located within the eye gaze of the driver 108 and prioritizing the objects with respect to object importance with respect to a takeover operation of the driver 108. In one embodiment, the feature extraction module 142 may be configured to communicate with the ECU 104 and/or the autonomous controller 122 of the ego vehicle 102 to determine if the driver 108 manually takes over operation (e.g., driving) of the ego vehicle 102 during one or more points in time as the ego vehicle 102 is being autonomously operated.

Upon receiving data from the ECU 104 and/or the autonomous controller 122 regarding the driver's takeover of the manual operation of the ego vehicle 102, the feature extraction module 142 may be configured to analyze the dynamic objects 202 and the static objects 204 that are located within the driving scene 200 that have been previously classified by the feature extraction module 142 and positioned with respect to their relative positions to the ego vehicle 102 within the driving scene 200 (as determined at block 404 of the method 400). In particular, the feature extraction module 142 may be configured to analyze the classification of the objects 202, 204 and their relative positions to prioritize the objects 202, 204 based on a level of importance with respect to being a cause that may impact the driver's decision to manually takeover the ego vehicle 102.

The level of importance may pertain to being a cause that may impact the driver's decision to manually takeover the ego vehicle 102 to complete one or more manual driving maneuvers (e.g., turning, braking, accelerating, etc.) from the autonomous operation of the ego vehicle 102. In other words, the cause may include one or more dynamic objects 202 and/or static objects 204 that may influence the driver 108 to takeover from the autonomous operation of the ego vehicle 102 to complete one or more manual driving maneuvers. For example, a cause may include a pedestrian crossing the street, a traffic sign, and/or another vehicle that may divert the driver's attention as the ego vehicle 102 is being autonomously operated and may (fully or partially) cause the driver 108 to complete a manual steering, braking, or accelerating maneuver of the ego vehicle 102.

In one embodiment, upon determining the level of importance, the feature extraction module 142 may evaluate the levels of importance and prioritize each of the objects 202, 204 based on their respective level of importance with respect to being a cause that may impact the driver's decision to manually takeover the ego vehicle 102. Accordingly, the feature extraction module 142 may be configured to prioritize the objects 202, 204 based on an amount of influence to cause a takeover of the manual operation of the ego vehicle 102 by the driver 108 and may classify one or more dynamic objects 202 and/or one or more static objects 204 as important to determine driving intention features that may be determined as important with respect to being a cause that may impact the driver's decision to manually takeover the ego vehicle 102.

The method 400 may proceed to block 410, wherein the method 400 may include analyzing the driver takeover event to extract driving intention features. In one embodiment, the takeover intention detection module 144 may be configured to communicate data associated with the classification and relative positions of one or more objects that are classified as important in addition to data associated with the eye gaze features 304 to the neural network 110. The neural network 110 may be utilized to provide machine learning/deep learning techniques with respect to one or more pre-trained datasets to determine driving intention features associated with the intention of the driver 108 of the ego vehicle 102 at one or more future points in time.

In particular, the driving intention features 310 may pertain to intentions of the driver 108 that may be determined based on the driver's eye gaze, manual driving maneuvers, and/or a cause (e.g., a pedestrian crossing the street, a traffic sign) associated with the important objects (determined at block 408) that may impact the driver's decision to manually takeover the ego vehicle 102. As shown in the illustrative example of FIG. 3, the driving intention features 310 may include, but may not be limited to, annotation of operating goals that may be associated with an intended destination of the driver 108, cause, and attention, among other features that may be extracted based on data output by the neural network 110 associated with the important objects, the driver's eye gaze, manual driving maneuvers, and/or causes that may impact the driver's decision to manually takeover the ego vehicle 102 during the autonomous operation of the ego vehicle 102.

In one embodiment, upon extracting the driving intention features 310, the feature extraction module 142 may be configured to communicate the driving intention features 310 to the feature extraction module 142. This functionality may consider any manual takeover events that may be completed by the driver 108 of the ego vehicle 102 during the real time autonomous operation of the ego vehicle 102 with respect to detecting a probable driver takeover intent of the driver 108 during one or more future points in time.

Figure 5:
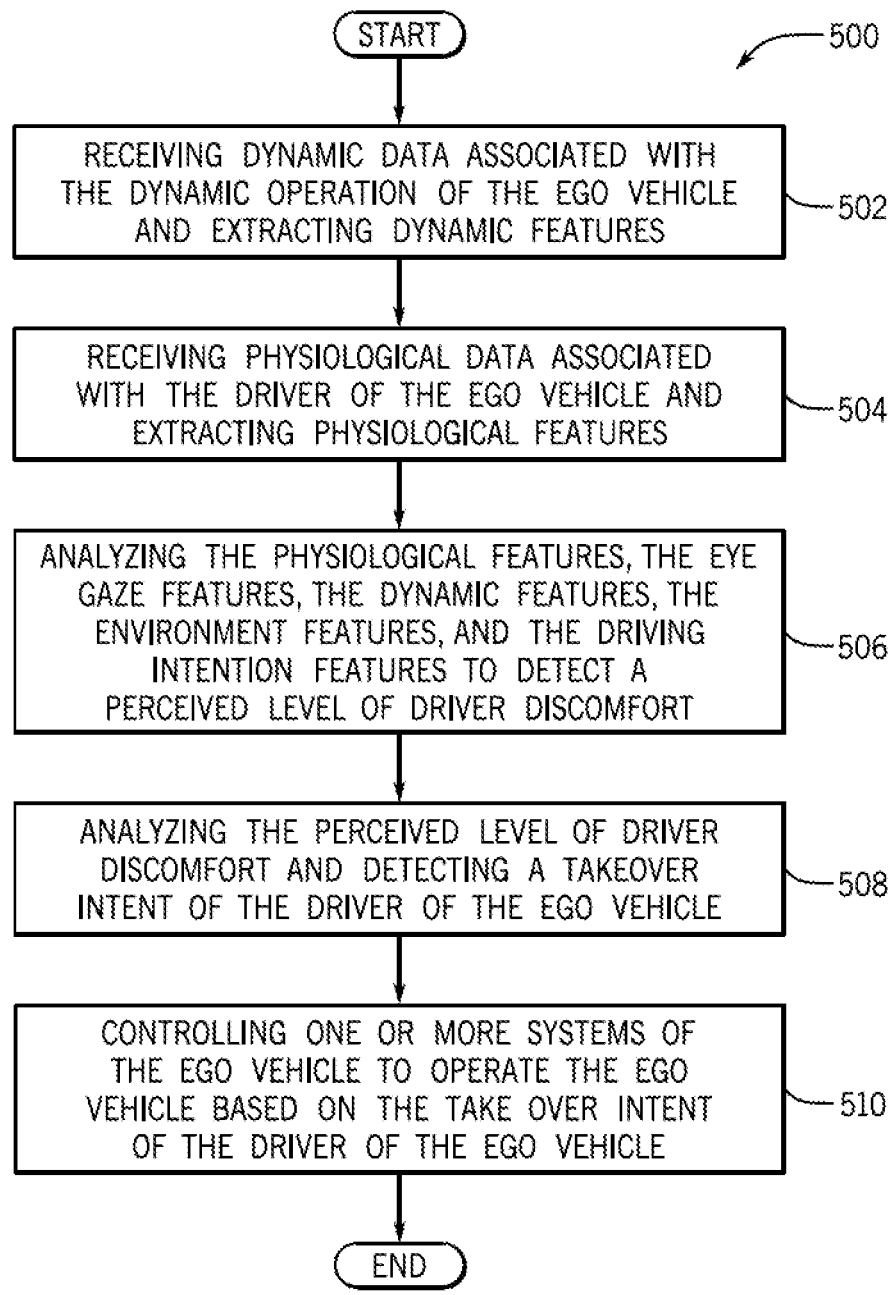
FIG. 5 is a process flow diagram of a method for detecting a perceived level of driver discomfort and detecting a takeover intent of the driver of the ego vehicle according to an exemplary embodiment of the present disclosure.

FIG. 5 is a process flow diagram of a method 500 for detecting a perceived level of driver discomfort and detecting a takeover intent of the driver 108 of the ego vehicle 102 according to an exemplary embodiment of the present disclosure. FIG. 5 will be described with reference to the components of FIGS. 1-3 though it is to be appreciated that the method 500 of FIG. 5 may be used with other systems/components. The method 500 may begin at block 502, wherein the method 500 may include receiving dynamic data associated with the dynamic operation of the ego vehicle 102 and extracting dynamic features.

In an exemplary embodiment, the data reception module 140 may be configured to communicate with the dynamic sensors 126 of the ego vehicle 102 to receive dynamic data associated with the dynamic operation of the ego vehicle 102. In an exemplary embodiment, the dynamic data that is output by the dynamic sensors 126 may be associated with a real time dynamic operation of the ego vehicle 102 as it is being operated within the driving scene 200. In particular, the dynamic data may be output in the form of one or more values (e.g., numeric levels) that are associated with the real-time dynamic performance of the ego vehicle 102 as the ego vehicle 102 is operated.

In an exemplary embodiment, the feature extraction module 142 may be configured to analyze the dynamic data associated with the real time autonomous operation of the ego vehicle 102 and may extract the dynamic features 306 that may be associated with the dynamic operation of the ego vehicle 102. Referring to the illustrative example of FIG. 3, the dynamic features 306 may include, but may not be limited to, a steering angle, a steering speed, a throttle angle, a brake pedal angle, a speed of the ego vehicle 102, an acceleration rate of the ego vehicle 102, a minimum, maximum, and standard deviation of the one or more of the dynamic features. Additional illustrative dynamic features (not shown in FIG. 3) may include, but may not be limited to, a velocity of the ego vehicle 102, a wheel speed of the ego vehicle 102, a transmission gear of the ego vehicle 102, a temperature associated with one or more components of the ego vehicle 102, an RPM of an engine (not shown) of the ego vehicle 102, and the like. In one embodiment, upon extracting the dynamic features 306, the feature extraction module 142 may be configured to communicate the dynamic features 306 to the feature extraction module 142.

With continued reference to FIG. 5, the method 500 may proceed to block 504, wherein the method 500 may include receiving physiological data associated with the driver 108 of the ego vehicle 102 and extracting physiological features. In an exemplary embodiment, the data reception module 140 may be configured to receive physiological data associated with the driver 108 of the ego vehicle 102 from the physiological sensors 120 of the ego vehicle 102. The physiological sensors 120 may be configured to sense data associated with the driver's physiological state during the operation of the ego vehicle 102 (during the autonomous operation of the ego vehicle 102 and/or during manual takeover of the operation of the ego vehicle 102 by the driver 108). In one configuration, various types of physiological data that may be sensed by the physiological sensors 120 may include, but may not be limited to, skin conduction measurements that are based on the measurement of skin conductance from two or more points of the driver's skin, heart information, such as, heart rate, blood pressure, blood flow, oxygen content, respiration rate information, as well as other kinds of information related to the autonomic nervous system or other biological systems of the driver 108.

In one embodiment, upon receiving the physiological data, the data reception module 140 may be configured to communicate the physiological data to the feature extraction module 142 to further analyze the physiological data. In an exemplary embodiment, the feature extraction module 142 may be configured to analyze the physiological data against a pre-trained dataset of the neural network 110 and may extract the physiological features 302 that may be associated with a physiological state and/or physiological spikes of the driver 108 during the operation of the ego vehicle 102.

As shown in the illustrative example of FIG. 3, the physiological features 302 may include, but may not be limited to, a minimum, maximum, mean, and standard deviation of heart rate level, a minimum, maximum, mean, and standard deviation of galvanic skin response levels, heart rate and skin conductance levels, among other features that may be extracted based on data output by the neural network 110. In one or more embodiments, upon extracting the physiological features 302, the feature extraction module 142 may be configured to communicate the physiological features 302 to the takeover intent detection module 144 to be further analyzed.

With continued reference to FIG. 5, the method 500 may proceed to block 506, wherein the method 500 may include analyzing the physiological features 302, the eye gaze features 304, the dynamic features 306, the environment features 308, and the driving intention features 310 to detect a perceived level of driver discomfort. In an exemplary embodiment, the takeover intent detection module 144 may be configured to evaluate the extracted features 302-310 and may compare the extracted features against pre-trained classifiers to classify one or more events that may pertain to one or more perceived levels of driver discomfort.

In some embodiments, the extracted features 302-310 may be analyzed with respect to respective subjective time windows to determine an aggregation of feature values that may be compared to one or more threshold values to detect a perceived level of driver discomfort. In one configuration, the takeover intent detection module 144 may be configured to quantitively estimate how informative each feature is with respect to the perceived level of driver discomfort and may utilized a pre-trained Random Forest group model to classify physiological spikes, takeovers, eye gaze related information, vehicle dynamic operation related information, and/or environment related information.

In one embodiment, the takeover intent detection module 144 may also utilize a Gini impurity measurement as a measurement to validate if classifications of a new instance of a random variable are correct if a new instance has been randomly classified according to a distribution of class labels. The Gini impurity measure may be computed by the following:

$$G = \sum_{i=1}^{C} p_i(1-p_i)$$

where p is the probability of a certain classification per the training dataset.

In one embodiment, the extracted features 302-310 may be weighted according to the modality of each extracted feature 302-310 to detect the perceived level of driver discomfort. In one configuration, feature importance may be weighted higher for physiological features 302 that may indicate physiological spikes, eye gaze features 304 that may pertain to the driver's eye gaze focus, and/or driving intention features 310 that may pertain to real time driver takeover events as being dominant indicators to detect a perceived level of driver discomfort at one or more timesteps. Additionally, feature importance may be weighted as lower for dynamic features 306 and environment features 308 as being more informative in detecting the perceived level of driver discomfort rather than quantitative. In an exemplary embodiment, upon weighting the extracted features 302-310 wherein the weighted features are aggregated based on respective weights to detect the perceived level of driver discomfort.

In an exemplary embodiment, upon detecting the perceived level of driver discomfort, the takeover intent detection module 144 may quantify the perceived level of driver discomfort by outputting the perceived level as a numeric value. The numeric value may be output as part of a range (e.g., 0.01-10.00) that may indicate the perceived level of the driver discomfort at each timestep that corresponds to timesteps that each of the extracted features 302-310 were captured during the autonomous operation of the ego vehicle 102.

The method 500 may proceed to block 508, wherein the method 500 may include analyzing the perceived level of driver discomfort and detecting a takeover intent of the driver of the ego vehicle 102. In an exemplary embodiment, upon quantifying the perceived level of driver discomfort by outputting the perceived level as a numeric value, the takeover intent detection module 144 may be configured to process a takeover intent threshold value that may be utilized to determine the takeover intent of the driver 108 of the ego vehicle 102.

In one embodiment, the takeover intent detection module 144 may be configured to process a takeover intent threshold value as a dynamic value that may change based on a number of factors including, but not limited to, dynamic features 306 associated with the real time dynamic operation of the ego vehicle 102, environment features 308 associated with the driving scene 200 and/or objects 202, 204 that are located within the driving scene 200, relative positions of objects 202, 204, the eye gaze focus of the driver 108 with respect to one or more objects 202, 204 and/or portions of the driving scene 200, and additional characteristics of the driving scene 200. In one embodiment, upon processing the takeover intent threshold value, the takeover intent detection module 144 may be configured to compare the numeric value associated with the perceived level of the driver discomfort to the takeover intent threshold value to determine if the numeric value meets or exceeds the takeover intent threshold value.

In one embodiment, if the numeric value meets or exceeds the takeover intent threshold value, the takeover intent detection module 144 may detect a probable takeover intent of the driver 108 may take place at one or more future points in time. Alternatively, if the numeric value does not meet the takeover intent threshold value, the takeover intent detection module 144 may determine that the driver 108 of the ego vehicle 102 is not likely to takeover manual operation of the ego vehicle 102 during the autonomous operation of the ego vehicle 102 at one or more future time steps. In one configuration, upon detecting that a probable takeover intent of the driver 108 at one or more future time steps, the takeover intent detection module 144 may be configured to communicate respective data regarding the detected probable takeover intent and a probable future time step (t+n)

that the takeover intent may take place to the vehicle control module 146 of the takeover detection application 106.

With continued reference to FIG. 5, the method 500 may proceed to block 510, wherein the method 500 may include controlling one or more systems of the ego vehicle 102 to operate the ego vehicle 102 based on the takeover intent of the driver 108 of the ego vehicle 102. In an exemplary embodiment, the vehicle control module 146 may analyze the data associated with the detected probable takeover intent and probable timeframe that the takeover intent may take place and may determine one or more autonomous maneuvers that may be completed to ease the perceived level of driver discomfort.

In one embodiment, upon determining one or more autonomous maneuvers that may be completed to ease the perceived level of driver discomfort, the vehicle control module 146 may be configured to output one or more commands that may be associated with driving parameters to autonomously control the operation of the ego vehicle 102 to complete the one or more autonomous maneuvers that may be completed to ease the perceived level of driver discomfort while accounting for one or more objects 202, 204 that may be located at a relative predetermined position of the ego vehicle 102 within the driving scene 200.

In particular, the vehicle control module 146 may be configured to communicate the one or more commands to the autonomous controller 122 of the ego vehicle 102. The autonomous controller 122 may thereby operably control the systems/control units 124 of the ego vehicle 102 to autonomously operate the ego vehicle 102 according to the commands to provide one or more autonomous maneuvers to alter the autonomous operation of the ego vehicle 102 in such a manner that that may minimize driver discomfort.

Accordingly, the autonomous operation of the ego vehicle 102 may be altered to operate within the driving scene 200 to optimize speed, steering, braking, and the like in a manner that that may minimize any potential motivation that is driven by driver discomfort that may cause the driver 108 to take over manual control of the ego vehicle 102 from an autonomous operating state of the ego vehicle 102. Stated differently, this functionality may minimize the effect of any causes that may potentially motivate the driver 108 to take over manual control of the ego vehicle 102 from an autonomous operating state. For example, one or more commands may be sent to the autonomous controller 122 to ensure that the ego vehicle 102 is autonomously operated to complete acceleration, braking, and/or steering in a way that may ease/lessen/minimize the driver's perceived level of discomfort during the autonomous operation of the ego vehicle 102 to thereby minimize any potential motivation that is driven by driver discomfort that may cause the driver 108 to take over manual control of the ego vehicle 102.

Figure 6:
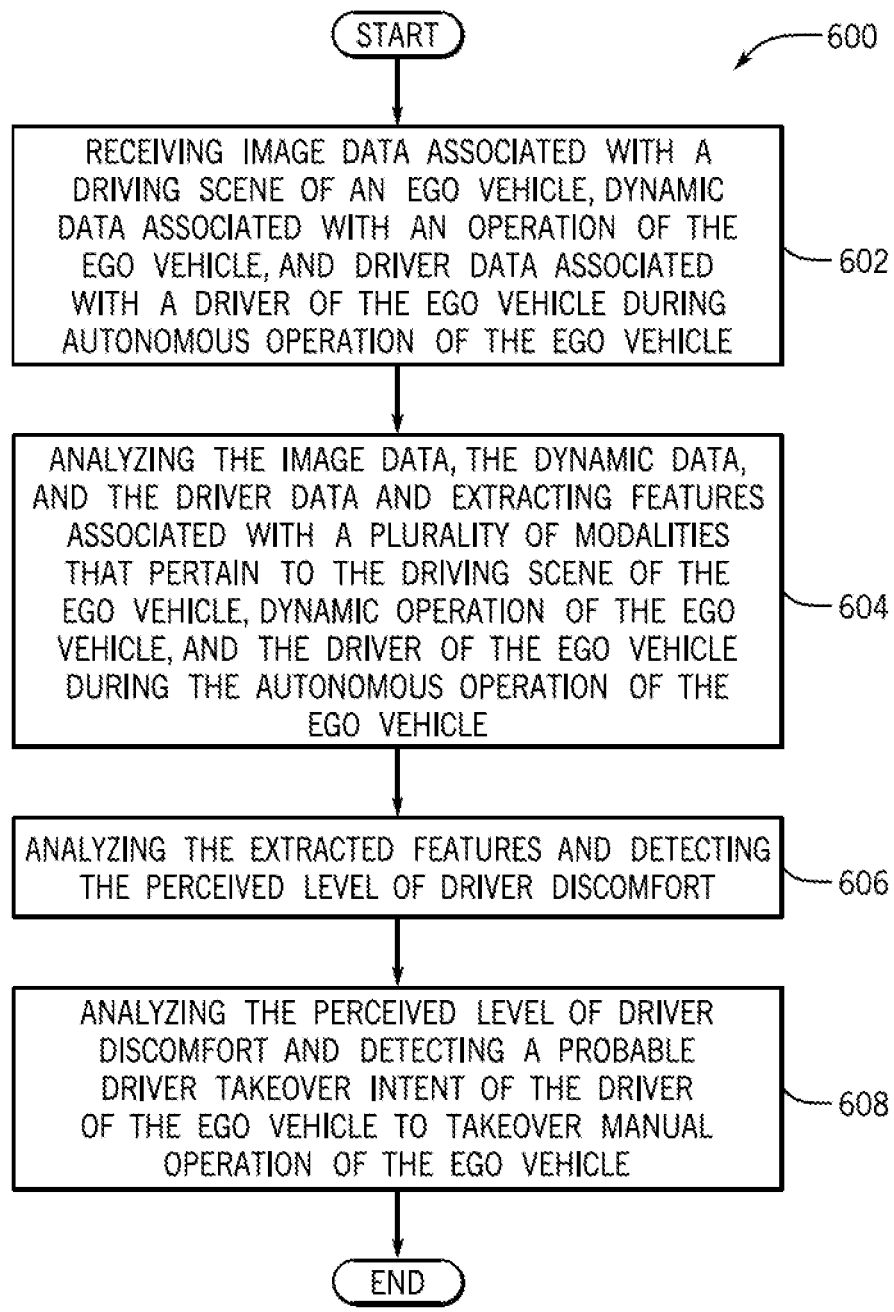
FIG. 6 is a process flow diagram of a method for detecting a perceived level of driver discomfort in an automated vehicle based on a perceived level of driver discomfort according to an exemplary embodiment of the present disclosure.

FIG. 6 is a process flow diagram of a method 600 for detecting a perceived level of driver discomfort in an automated vehicle 102 based on a perceived level of driver discomfort according to an exemplary embodiment of the present disclosure. FIG. 6 will be described with reference to the components of FIGS. 1-3 though it is to be appreciated that the method 600 of FIG. 6 may be used with other systems/components. The method 600 may begin at block 602, wherein the method 600 may include receiving image data associated with a driving scene 200 of an ego vehicle 102, dynamic data associated with an operation of the ego vehicle 102, and driver data associated with a driver 108 of the ego vehicle 102 during autonomous operation of the ego vehicle 102.

The method 600 may proceed to block 604, wherein the method 600 may include analyzing the image data, the dynamic data, and the driver data and extracting features associated with a plurality of modalities that pertain to the driving scene 200 of the ego vehicle 102, dynamic operation of the ego vehicle 102, and the driver 108 of the ego vehicle 102 during the autonomous operation of the ego vehicle 102.

The method 600 may proceed to block 606, wherein the method 600 may include analyzing the extracted features and detecting the perceived level of driver discomfort. The method 600 may proceed to block 608, wherein the method 600 may include analyzing the perceived level of driver discomfort and detecting a probable driver takeover intent of the driver of the ego vehicle 102 to takeover manual operation of the ego vehicle 102.

It should be apparent from the foregoing description that various exemplary embodiments of the disclosure may be implemented in hardware. Furthermore, various exemplary embodiments may be implemented as instructions stored on a non-transitory machine-readable storage medium, such as a volatile or non-volatile memory, which may be read and executed by at least one processor to perform the operations described in detail herein. A machine-readable storage medium may include any mechanism for storing information in a form readable by a machine, such as a personal or laptop computer, a server, or other computing device. Thus, a non-transitory machine-readable storage medium excludes transitory signals but may include both volatile and non-volatile memories, including but not limited to read-only memory (ROM), random-access memory (RAM), magnetic disk storage media, optical storage media, flash-memory devices, and similar storage media.

It should be appreciated by those skilled in the art that any block diagrams herein represent conceptual views of illustrative circuitry embodying the principles of the disclosure. Similarly, it will be appreciated that any flow charts, flow diagrams, state transition diagrams, pseudo code, and the like represent various processes which may be substantially represented in machine readable media and so executed by a computer or processor, whether or not such computer or processor is explicitly shown.

It will be appreciated that various implementations of the above-disclosed and other features and functions, or alternatives or varieties thereof, may be desirably combined into many other different systems or applications. Also, that various presently unforeseen or unanticipated alternatives, modifications, variations or improvements therein may be subsequently made by those skilled in the art which are also intended to be encompassed by the following claims.

The invention claimed is:

1. A computer-implemented method for detecting a perceived level of driver discomfort in an automated vehicle comprising:
  receiving image data associated with a driving scene of an ego vehicle, dynamic data associated with an operation of the ego vehicle, and driver data associated with a driver of the ego vehicle during autonomous operation of the ego vehicle;
  analyzing the image data, the dynamic data, and the driver data and extracting features associated with a plurality of modalities that pertain to the driving scene of the ego vehicle, dynamic operation of the ego vehicle, and the driver of the ego vehicle during the autonomous operation of the ego vehicle;
  analyzing the extracted features and detecting the perceived level of driver discomfort;

analyzing the perceived level of driver discomfort and detecting a probable driver takeover intent of the driver of the ego vehicle to takeover manual operation of the ego vehicle;

upon detecting the probable driver takeover intent, communicating data concerning the probable driver takeover intent and a probable future time step at which a takeover intent by the driver is expected to occur; and autonomously controlling at least one system of the ego vehicle to determine and complete autonomous maneuvers aimed at easing the perceived level of driver discomfort based on the probable driver takeover intent and the probable future time step.

2. The computer-implemented method of claim 1, wherein the driver data includes eye gaze data associated with an eye gaze of the driver of the ego vehicle and physiological data associated with a physiological state of the driver of the ego vehicle, and analyzing the image data, the dynamic data, and the driver data and extracting features associated with the plurality of modalities includes analyzing objects that are located within the eye gaze of the driver and prioritizing these objects based on object importance, and the object importance is associated with a decision of the driver to initiate a manual takeover operation of the ego vehicle.

3. The computer-implemented method of claim 2, wherein analyzing the image data, the dynamic data, and the driver data and extracting features associated with the plurality of modalities includes analyzing the physiological data and extracting physiological features that include at least one of: information associated with galvanic skin response levels, heart rate, and skin conductance levels of the driver of the ego vehicle.

4. The computer-implemented method of claim 2, wherein analyzing the image data, the dynamic data, and the driver data and extracting features associated with the plurality of modalities includes analyzing the eye gaze data and extracting eye gaze features that include at least one of: eye gaze fixation positions, pupil diameters, gaze object of fixation, eye gaze region entropy, and eye gaze object entropy.

5. The computer-implemented method of claim 2, wherein analyzing the image data, the dynamic data, and the driver data and extracting features associated with the plurality of modalities includes analyzing the image data and extracting environment features that are associated with the driving scene of the ego vehicle that include at least one of: relative positions of dynamic objects with respect to the ego vehicle, availability of travel paths within the driving scene, and lane measurements of lanes within the driving scene.

6. The computer-implemented method of claim 2, wherein analyzing the image data, the dynamic data, and the driver data and extracting features associated with the plurality of modalities includes analyzing the dynamic data and extracting dynamic features that are associated with a dynamic operation of the ego vehicle that include at least one of: a steering angle, a steering speed, a throttle angle, a brake pedal angle, a speed of the ego vehicle, and an acceleration rate of the ego vehicle.

7. The computer-implemented method of claim 2, wherein driving intention features associated with intentions of the driver that are associated with the object importance are extracted and include at least one of: annotation of operating goals that are associated with an intended destination of the driver, and an attention of the driver of the ego vehicle.

8. The computer-implemented method of claim 1, wherein analyzing the extracted features and detecting the perceived level of driver discomfort includes weighting the extracted features and according to a modality of each of the extracted features, wherein features associated with an eye gaze of the driver, a physiological state of the driver, and a driving intention during takeover events are weighted higher than features associated with a dynamic operation of the ego vehicle and the driving scene of the ego vehicle, wherein the weighted features are aggregated based on respective weights to detect the perceived level of driver discomfort.

9. The computer-implemented method of claim 1, wherein analyzing the perceived level of driver discomfort and detecting the probable driver takeover intent of the driver of the ego vehicle includes outputting the perceived level of driver discomfort as a numeric value that is compared against a takeover intent threshold value to detect if the numeric value meets or exceeds the takeover intent threshold value to detect the probable driver takeover intent of the driver, wherein the takeover intent threshold value is a dynamic value that changes based on at least one of: dynamic features associated with the dynamic operation of the ego vehicle, environment features associated with the driving scene, and an eye gaze focus of the driver.

10. A system for detecting a perceived level of driver discomfort in an automated vehicle comprising:

a memory storing instructions when executed by a processor cause the processor to:

receive image data associated with a driving scene of an ego vehicle, dynamic data associated with an operation of the ego vehicle, and driver data associated with a driver of the ego vehicle during autonomous operation of the ego vehicle;

analyze the image data, the dynamic data, and the driver data and extracting features associated with a plurality of modalities that pertain to the driving scene of the ego vehicle, dynamic operation of the ego vehicle, and the driver of the ego vehicle during the autonomous operation of the ego vehicle;

analyze the extracted features and detecting the perceived level of driver discomfort;

analyze the perceived level of driver discomfort and detecting a probable driver takeover intent of the driver of the ego vehicle to takeover manual operation of the ego vehicle;

upon detecting the probable driver takeover intent, communicate data concerning the probable driver takeover intent and a probable future time step at which a takeover intent by the driver is expected to occur; and autonomously control at least one system of the ego vehicle to determine and complete autonomous maneuvers aimed at easing the perceived level of driver discomfort based on the probable driver takeover intent and the probable future time step.

11. The system of claim 10, wherein the driver data includes eye gaze data associated with an eye gaze of the driver of the ego vehicle and physiological data associated with a physiological state of the driver of the ego vehicle, and analyzing the image data, the dynamic data, and the driver data and extracting features associated with the plurality of modalities includes analyzing objects that are located within the eye gaze of the driver and prioritizing these objects based on object importance, and the object importance is associated with a decision of the driver to initiate a manual takeover operation of the ego vehicle.

12. The system of claim 11, wherein analyzing the image data, the dynamic data, and the driver data and extracting features associated with the plurality of modalities includes analyzing the physiological data and extracting physiological features that include at least one of: information associated with galvanic skin response levels, heart rate, and skin conductance levels of the driver of the ego vehicle.

13. The system of claim 11, wherein analyzing the image data, the dynamic data, and the driver data and extracting features associated with the plurality of modalities includes analyzing the eye gaze data and extracting eye gaze features that include at least one of: eye gaze fixation positions, pupil diameters, gaze object of fixation, eye gaze region entropy, and eye gaze object entropy.

14. The system of claim 11, wherein analyzing the image data, the dynamic data, and the driver data and extracting features associated with the plurality of modalities includes analyzing the image data and extracting environment features that are associated with the driving scene of the ego vehicle that include at least one of: relative positions of dynamic objects with respect to the ego vehicle, availability of travel paths within the driving scene, and lane measurements of lanes within the driving scene.

15. The system of claim 11, wherein analyzing the image data, the dynamic data, and the driver data and extracting features associated with the plurality of modalities includes analyzing the dynamic data and extracting dynamic features that are associated with a dynamic operation of the ego vehicle that include at least one of: a steering angle, a steering speed, a throttle angle, a brake pedal angle, a speed of the ego vehicle, and an acceleration rate of the ego vehicle.

16. The system of claim 11, wherein driving intention features associated with intentions of the driver that are associated with the object importance are extracted and include at least one of: annotation of operating goals that are associated with an intended destination of the driver, and an attention of the driver of the ego vehicle.

17. The system of claim 10, wherein analyzing the extracted features and detecting the perceived level of driver discomfort includes weighting the extracted features and according to a modality of each of the extracted features, wherein features associated with an eye gaze of the driver, a physiological state of the driver, and a driving intention during takeover events are weighted higher than features associated with a dynamic operation of the ego vehicle and the driving scene of the ego vehicle, wherein the weighted features are aggregated based on respective weights to detect the perceived level of driver discomfort.

18. The system of claim 10, wherein analyzing the perceived level of driver discomfort and detecting the probable driver takeover intent of the driver of the ego vehicle includes outputting the perceived level of driver discomfort as a numeric value that is compared against a takeover intent threshold value to detect if the numeric value meets or exceeds the takeover intent threshold value to detect the probable driver takeover intent of the driver, wherein the takeover intent threshold value is a dynamic value that changes based on at least one of: dynamic features associated with the dynamic operation of the ego vehicle, environment features associated with the driving scene, and an eye gaze focus of the driver.

19. A non-transitory computer readable storage medium storing instructions that when executed by a computer, which includes a processor performs a method, the method comprising:
receiving image data associated with a driving scene of an ego vehicle, dynamic data associated with an operation of the ego vehicle, and driver data associated with a driver of the ego vehicle during autonomous operation of the ego vehicle;
analyzing the image data, the dynamic data, and the driver data and extracting features associated with a plurality of modalities that pertain to the driving scene of the ego vehicle, dynamic operation of the ego vehicle, and the driver of the ego vehicle during the autonomous operation of the ego vehicle;
analyzing the extracted features and detecting a perceived level of driver discomfort;
analyzing the perceived level of driver discomfort and detecting a probable driver takeover intent of the driver of the ego vehicle to takeover manual operation of the ego vehicle;
upon detecting the probable driver takeover intent, communicating data concerning the probable driver takeover intent and a probable future time step at which a takeover intent by the driver is expected to occur; and
autonomously controlling at least one system of the ego vehicle to determine and complete autonomous maneuvers aimed at easing the perceived level of driver discomfort based on the probable driver takeover intent and the probable future time step.

20. The non-transitory computer readable storage medium of claim 19, wherein analyzing the perceived level of driver discomfort and detecting the probable driver takeover intent of the driver of the ego vehicle includes outputting the perceived level of driver discomfort as a numeric value that is compared against a takeover intent threshold value to detect if the numeric value meets or exceeds the takeover intent threshold value to detect the probable driver takeover intent of the driver, wherein the takeover intent threshold value is a dynamic value that changes based on at least one of: dynamic features associated with the dynamic operation of the ego vehicle, environment features associated with the driving scene, and an eye gaze focus of the driver.

* * * * *